United States Patent [19]

Chambers, Jr.

[11] 3,763,320

[45] Oct. 2, 1973

[54] VOLTAGE BOOSTER CIRCUIT HAVING TEST-THROUGH CHARACTERISTICS

[75] Inventor: Charles W. Chambers, Jr., Amherst, Ohio

[73] Assignee: Lorain Products Corporation, Lorain, Ohio

[22] Filed: Oct. 20, 1971

[21] Appl. No.: 190,855

[52] U.S. Cl. .......... 179/16 F

[51] Int. Cl. .......... H04g 1/28

[58] Field of Search .......... 179/16 E, 16 EA, 179/16 EC, 16 F, 175.31 R

[56] References Cited

UNITED STATES PATENTS

| | | | |
|---|---|---|---|
| 3,621,143 | 11/1971 | Chambers | 179/16 F |
| 3,531,598 | 9/1970 | McNair, Jr. | 179/16 F |
| 3,527,894 | 9/1970 | Mesenheimer et al. | 179/16 F |
| 3,514,543 | 5/1970 | Rae | 179/16 F |
| 3,339,027 | 8/1967 | Feiner et al. | 179/16 F |

*Primary Examiner*—Kathleen H. Claffy
*Assistant Examiner*—Randall P. Myers
*Attorney*—Gustalo Nunez

[57] ABSTRACT

A circuit for increasing the magnitude of subscriber line current flow in a variety of types of telephone systems. A voltage booster network is connected in series with at least one conductor of a subscriber line. Each voltage booster network includes circuitry for conducting subscriber line current in first and second directions therethrough. D-C boost voltage supply means is connected to each booster network to additively increase the flow of subscriber line current therethrough. Each voltage booster network includes control circuitry which causes that network to exhibit a boost voltage-line current characteristic having a low current region wherein substantially no boost voltage is produced allowing accurate line testing therethrough, a middle current region wherein the boost voltage increases substantially linearly with line current affording pulse adjustment and a high current region wherein the boost voltage remains substantially constant with line current to provide voltage boosting which is stable with respect to variations in line current. Each voltage booster network also includes time-delay circuitry which slows the dynamic response of the circuit of the invention to prevent the latter from increasing the amplitude of the transient currents which accompany telephone system polarity reversals and thereby reduce the probability of premature ring-trip or other undesirable relay operation.

29 Claims, 3 Drawing Figures

PATENTED OCT 2 1973

3,763,320

SHEET 1 OF 2

INVENTOR:
CHARLES W. CHAMBERS JR.

BY *John Haraf Smith*

ATTORNEY

INVENTOR:
CHARLES W. CHAMBERS JR.
BY
John Howard Smith
ATTORNEY

VOLTAGE BOOSTER CIRCUIT HAVING TEST-THROUGH CHARACTERISTICS

BACKGROUND OF THE INVENTION

The present invention relates to voltage booster circuits and is directed more particularly to voltage booster circuits for telephone systems.

An important consideration in the provision of telephone service is the maintenance of an adequate d-c current flow in each subscriber line. This subscriber line current performs a variety of telephone system operations including the operation of a dialing relay during dialing and the operation of a trip relay to terminate the ringing sound when the called party's receiver is lifted. If the subscriber line current is of insufficient magnitude, the above named relays and others will fail to operate and the telephone set or sets connected to that subscriber line will be useless.

The difficulty in establishing an adequate d-c current flow in each of a multiplicity of subscriber lines is that each subscriber line has a d-c resistance which is a function of the length of that line. For economic reasons it has been found advantageous to energize the majority of subscriber lines from a central office battery of generally adequate terminal voltage, and to provide a plurality of voltage booster circuits to increase the voltage applied to those relatively few subscriber lines having resistances too high to operate directly from the central office battery. These voltage booster circuits are arranged to add a d-c boost voltage in series-aiding relationship between the central office battery and respective high resistance subscriber lines.

Because of the widespread use of reverse battery supervision, that is, the use of reversals in the polarity with which the central office battery is applied to a subscriber line for supervisory or control purposes, a voltage booster source which is connected in series-aiding relationship to the subscriber line current for one central office battery polarity is in series opposition, and therefore in voltage reducing relationship to the subscriber line current for the opposite central office battery polarity. In order to overcome this problem, various voltage booster circuits have been developed which will coordinate the polarity of the serially added boost voltage with the then polarity of central office battery so as to assure a series-aiding relationship therebetween in the presence of supervisory polarity reversals. While these voltage booster circuits operate with some success in connection with particular types of subscriber lines, prior to the present invention, these devices generally would not operate satisfactorily with substantially all types of subscriber lines and telephone system switchgear configurations.

Some subscriber lines, for example, require voltage booster circuits which reverse the polarity of the boost voltage sufficiently slowly to prevent the voltage booster from appreciably increasing the amplitude of line current transients. This is because increasing the amplitude of these transients may cause premature operation of the central office trip relay and thereby terminate a call before pickup by the called party, a condition known as premature ring-trip or pretrip. This is also because increasing the amplitude of transient currents may cause improper operation of a polar relay as, for example, in certain telephone systems utilizing Strowger Automatic Toll Ticketing.

These same subscriber lines may also have leakage resistances so low that voltage booster circuits which are to be used therewith must have a pulse adjusting characteristic, that is, a characteristic whereby the boost voltage terminates or decreases when the line current is made to fall to a value near that of the leakage current of the line as, for example, during dial pulse interruptions. This is because the failure to reduce the boost voltage during dial pulses can cause the leakage current of the line to increase to the point where switchgear which is responsive to substantial decreases or interruptions in subscriber line current cannot release.

In addition, some telephone systems require the occurrence and utilization of wink pulses, for example, 100 millisecond pulses which begin and end with reversals in the polarity of the d-c operating voltage of the subscriber line. Voltage booster circuits which operate in such systems must, of course, be able to transmit wink pulses.

Additionally, since it is necessary to perform routine subscriber line tests without removing the voltage booster circuits which service the lines being tested, it is highly desirable to utilize voltage booster circuits which do not significantly affect the results of line tests made therethrough.

In accordance with the present invention there is provided novel circuitry which satisfies all of the above described requirements and which is suitable for use in telephone systems utilizing Strowger Automatic Toll Ticketing, Tip Party Automatic Number Identification, coin systems using full prepay and other telephone system configurations.

SUMMARY OF THE INVENTION

It is an object of the invention to provide an improved voltage booster circuit for telephone systems.

Another object of the invention is to provide voltage booster circuitry which provides the above mentioned test-through and pulse adjustment characteristics and which substantially reduces the probability of premature ring-trip or other improper relay operation.

It is another object of the invention to provide a voltage booster circuitry having a pulse adjusting characteristic, that is, a booster circuit which reduces the magnitude of the boost voltage during periods of low current such as, for example, during dial pulse interruptions.

Still another object of the invention is to provide voltage booster circuitry that allows the line to which it is connected to be tested, while the voltage booster circuitry is in place, without affecting the results of the test.

Yet another object of the invention is to provide a voltage booster circuit which can change its operative condition rapidly enough to prevent it from interfering with the transmission of wink pulses.

A further object of the invention is to provide a voltage booster circuitry which reverses the polarity of its boost voltage slowly enough to prevent premature ring-trip or pretrip.

A still further object of the invention is to provide a voltage booster circuit which preserves the desired high leakage resistance between the subscriber line conductors and between ground and either subscriber line conductor.

It is yet another object of the invention to provide voltage booster circuitry which provides a d-c voltage boost during ringing to assure operation of the central office trip relay upon pick-up by the called party.

Another object of the invention is to provide voltage booster circuitry including a time-delay network whereby the rate at which the booster circuitry changes its boost voltage in response to changes in line current is slow enough that the booster circuitry does not materially increase the amplitude of a-c ringing current, line current transients caused by switching equipment or other noise and thereby increase the probability of premature ring trip or other improper relay operation.

It is another object of the invention to provide a voltage booster circuit including voltage responsive circuitry whereby the above time-delay network may be overridden to allow the boost voltage to change rapidly in accordance with predetermined changes in the voltage between ground and the subscriber line conductors to allow effective transmission of wink pulses.

Another object of the invention is to provide a voltage booster circuit having a voltage-current characteristic including a low current region in which substantially no boost voltage is produced, a middle current region in which the boost voltage is substantially proportional to the line current and a high current region in which the boost voltage remains substantially constant with line current.

It is another object of the invention to provide a voltage booster circuit wherein the upper limit of the low current region and the rate of change of boost voltage with line current in the middle current region may be set at first predetermined values for line current flow in one direction and may be set at second predetermined values for line current flow in the opposite direction.

It is yet another object of the invention to provide a voltage booster circuit wherein the magnitude of the boost voltage in the high current region may be preset at any desired value.

Generally speaking, the voltage booster circuit of the invention includes at least one voltage booster network for disposition in series with at least one conductor of a subscriber line. Each booster network includes circuitry for conducting the flow of subscriber line current in first and second directions through the respective subscriber line conductor. Each booster network also includes d-c boost voltage supply means for additively increasing the flow of subscriber line current through the respective booster network.

Each voltage booster network includes a sensing-control circuit for sensing the magnitude and direction of current flow through the respective subscriber line conductor and for controlling boost voltage provided by that booster network in accordance therewith. Each voltage booster network also includes time-delay circuitry for coupling the respective sensing-control circuit to the subscriber line. This coupling circuitry is arranged to prevent the sensing-control network from responding to the flow of a-c ringing or other transient currents to the extent desired and thereby, for example, reduce the probability of premature ring-trip. Finally, each booster network may include voltage responsive circuitry which enables the respective booster network to change its operative condition rapidly when rapid changes are desirable to accommodate conditions such as central office polarity reversals.

DESCRIPTION OF THE INVENTION

Figures 1, 2:
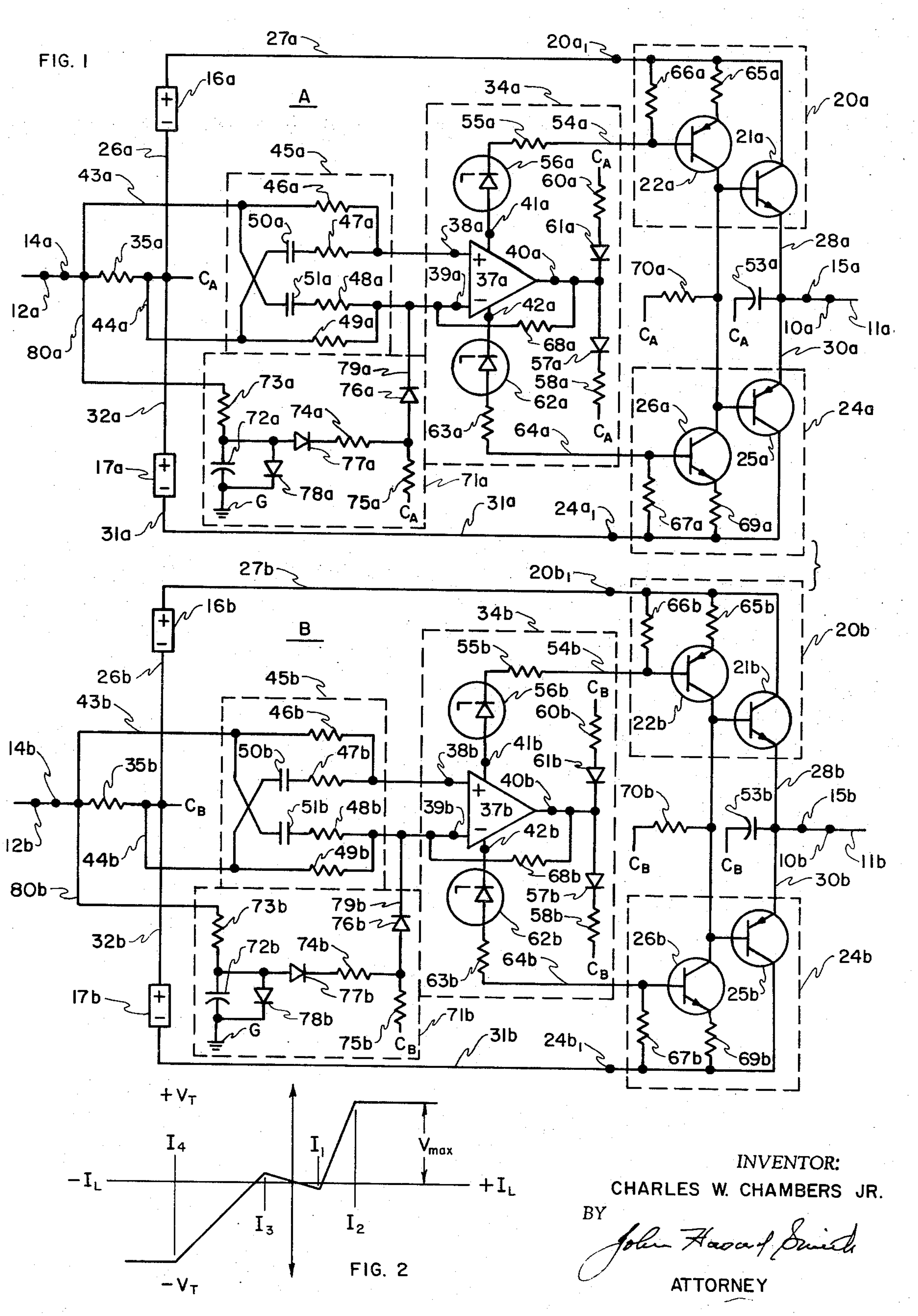
FIG. 1 is a schematic diagram of one exemplary circuit embodying the invention.
FIG. 2 is a graph showing the steady-state boost voltage established by the circuit of FIG. 1 as a function of subscriber line current.

Referring to FIG. 1, there are shown terminals **10*a* and 10*b* which represent the central office terminations of subscriber line conductors 11*a* and 11*b*, respectively. Also shown in FIG. 1 are terminals 12*a* and 12*b* which represent the terminals of the central office equipment. Connected between terminal pairs 10*a* and 12*a*, and 10*b* and 12*b*** is one exemplary embodiment of the voltage booster circuit of the invention.

In the present embodiment, the circuit of the invention includes a voltage booster network A having line terminals **14*a* and 15*a* for disposition between central office terminal 12*a* and subscriber line terminal 10*a*, and a voltage booster network B having line terminals 14*b* and 15*b* for disposition between central office terminal 12*b* and subscriber line terminal 10*b***. While the circuit of the invention is shown to be connected to the central office equipment terminals, it will be understood that it may, in practice, be located anywhere in the transmission path between the central office and the subscriber.

Booster network A is structurally identical to booster network B. Accordingly, similarly functioning circuit elements in the two booster networks are similarly numbered, the postscript *a* being applied to the circuit elements of booster network A and the postscript *b* being applied to the corresponding circuit elements of booster network B. In view of the similarities between networks A and B, it will be understood that remarks made with reference to one booster network are equally applicable to the other.

To the end that booster network A may additively increase the magnitude of the subscriber line current flowing therethrough, booster network A includes a first or positive d-c boost voltage supply **16*a* and a second or negative boost voltage supply 17*a*. Boost voltage supply 16*a* serves to additively increase the magnitude of the subscriber line current when the latter flows in a first or positive direction, that is, from central office terminal 12*a* to subscriber terminal 10*a* and boost voltage supply 17*a* serves to additively increase the magnitude of the subscriber line current when the latter flows in a second or negative direction, that is, from subscriber terminal 10*a* to central office terminal 12*a*. In the embodiment of FIG. 1, the junction between the positive lead of supply 17*a* and the negative lead of supply 16*a*** is selected for use as a circuit common for booster network A, this common being designated $C_A$. It will be understood that all points which are labeled $C_A$ are at the potential of this circuit common.

To the end that the subscriber line current may be directed through the boost voltage supply, **16*a* or 17*a*, which has a polarity suitable for additively increasing the magnitude thereof, there are provided first and second variable conducting means 20*a* and 24*a*, respectively. In the present embodiment, first variable conducting means 20a includes a line current carrying transistor which here takes the form of an NPN transistor 21a and a control transistor here shown as a PNP transistor 22a. Variable conducting network 20a serves to conduct subscriber line current from line terminal 14a to line terminal 15a, through boost voltage supply 16a, when the latter current flows in the first or positive direction through conductor 11a. Similarly, second variable conducting means 24a includes a line current carrying transistor which here takes the form of a PNP transistor 25a and a control transistor here shown as an NPN transistor 26a. Variable conducting network 24a serves to conduct subscriber line current from line terminal 15a to line terminal 14a, through boost voltage supply 17a, when the latter current flows in the second or negative direction through conductor 22a**.

When central office terminal 12a is positive from central office terminal 12b, subscriber line current tends to flow in a clockwise direction in the subscriber loop connected to terminals 10a and 10b, that is, away from the central office through conductor 11a and toward the central office through conductor 11b. To accommodate this clockwise current flow condition, the circuit of FIG. 1 is arranged to establish conduction through variable conducting networks 20a and 24b. Network 20a allows subscriber line current to flow away from the central office through the path including a resistor 35a, a conductor 26a, boost voltage supply 16a, a conductor 27a, variable conducting network 20a, a conductor 28a, and conductor 11a. Since the latter current flows through boost voltage supply 16a which has a polarity which aids the flow of current away from the central office, it will be seen that the magnitude of the clockwise flowing subscriber line current is additively increased by the action of booster network A.

At the same time, network 24b allows subscriber line current to flow toward the central office through the path including conductor 11b, a conductor 30b, variable conducting network 24b, a conductor 31b, boost voltage supply 17b, conductor 32b, and resistor 35b. Since the latter current flows through boost voltage supply 17b which has a polarity which aids the flow of current toward the central office, it will be seen that the magnitude of the clockwise flowing subscriber line current is also additively increased by the action of booster network B.

Similarly, when terminal 12a is negative from terminal 12b, subscriber line current tends to flow in a counter-clockwise direction in the subscriber loop, that is, away from the central office in conductor 11b and toward the central office in conductor 11a. Under these conditions, variable conducting network 20b of booster network B conducts to insert boost supply 16b in series, power-aiding relationship to the subscriber line flowing away from the central office through conductor 11b and variable conducting network 24a of booster network A conducts to insert boost voltage supply 17a in series, power-aiding relationship to the subscriber line returning to the central office through conductor 11a. Thus, booster network A cooperates with booster network B to additively increase the subscriber line current for both directions of current flow through the subscriber loop.

A boost network having two d-c boost voltage supplies is connected in series with each conductor of the subscriber line to assure that the boost voltage inserted by the circuit of the invention is distributed evenly between the two sides of the subscriber line, thus affording a balanced boost voltage. Another reason for providing a booster network with two boost voltage supplies in series with each conductor is to assure that the advantages of voltage boosting may be afforded under telephone system operating conditions wherein current flows in one subscriber line conductor and not the other such as, for example, collect and return currents in prepay coin lines. Accordingly, if no such considerations are applicable in a particular telephone system, the desired voltage boosting activity may be afforded by connecting a voltage booster network such as network A in series with only one of the subscriber line conductors or by retaining both booster networks and eliminating (short-circuiting) one boost voltage supply in each booster network, for example, booster supplies 16a and 16b.

In accordance with one feature of the present invention, the steady-state boost voltages provided by the first and second boost voltage networks A and B, respectively, are arranged to vary in accordance with the magnitude and sign of the subscriber line current in the manner shown in FIG. 2. Therein, the subscriber line current in conductor 11a, $I_L$, is plotted on the horizontal axis, positive line current being current flowing away from the central office and negative line current being current flowing toward the central office; and the steady-state booster network terminal voltage, $V_T$, appearing between terminals 14a and 15a, is plotted on the vertical axis, positive terminal voltage being present when terminal 15a is positive from terminal 14a and negative terminal voltage being present when terminal 15a is negative from terminal 14a.

Referring to FIG. 2, it will be seen that when the subscriber line current is positive and is small in magnitude, that is, is in the test-through or low current region between the origin and $I_1$, the steady-state terminal voltage is small and negative. In this region, booster network A resists the flow of subscriber line current in the same manner as a positive resistance connected between terminals 14a and 15a. This region of the V-I characteristic allows telephone system personnel to pass test currents through the subscriber line, with the voltage booster circuit in place, without fear that these test currents will initiate voltage boosting activity and thereby affect the accuracy of test current readings.

In the pulse-adjusting or middle current region of FIG. 2, that is, between current values $I_1$ and $I_2$, the steady-state terminal voltage is positive and increases substantially linearly with increases in the subscriber line current. In this region, booster network A enhances the flow of subscriber line current in the manner of a negative resistance connected between terminals 14a and 15a. This region of the V-I characteristic assures that when the subscriber line current falls toward its leakage current value, such as, for example, during dial pulse interruptions, the terminal voltage falls with it to prevent the boosting of the leakage current and the resultant risk of improper operation of the central office dialing relay.

In the normal-operating or high current region of FIG. 2, that is, above $I_2$, the steady-state terminal voltage reaches its maximum, stable value, $V_{max}$, and is unaffected by further increases in subscriber line current. In this region, booster network A enhances the flow of subscriber line current in the manner of a d-c boost voltage supply connected between terminals 14a and 15a. This region of the V-I characteristic allows the booster network to afford the desired d-c line current flow while at the same time preventing the booster network terminal voltage from changing in response to line current fluctuations such as the a-c voice current of the talking party or noise signals on the line. The above three regions of the V-I characteristic of booster network A comprise what will hereinafter be referred to as the positive or forward steady-state characteristic thereof.

Similarly, when the subscriber line current is negative, as shown in FIG. 2, booster network A operates along a three-region operating characteristic having a first or test-through region between the origin and current $I_3$, a second or pulse-adjusting region between currents $I_3$ and $I_4$ and a normal-operating region above current $I_4$. The latter three regions of the V-I characteristic comprise what will hereinafter be referred to as the negative or reverse steady-state characteristic of booster network A. As will be explained more fully later, current values $I_1$ and $I_2$ of the forward characteristic of network A need not be equal and opposite to the current values $I_3$ and $I_4$ of the reverse characteristic of network A, that is, that the forward and reverse characteristics of network A need not be symmetrical. It will be understood that if, for reasons previously described, booster source 16a is eliminated (short-circuited), booster network A will exhibit a positive resistance characteristic for all positive values of subscriber line current therethrough.

To the end that booster network A may have a steady-state V-I characteristic of the type shown in FIG. 2, there is provided sensing-control means 34a. Sensing-control means 34a senses the magnitude and direction of current in subscriber line conductor 11a by sensing the magnitude and polarity of the voltage across a resistor 35a which is connected substantially in series between line terminals 14a and 15a to serve as line current indicating means. Sensing-control network 34a then controls the flow of current through network 20a or network 24a, in accordance with the sensed current, to establish between terminals 14a and 15a a voltage having a magnitude and polarity that approaches a steady-state value along the curve shown in FIG. 2.

In the present embodiment, sensing-control network 34a includes an operational amplifier 37a, which may be an integrated circuit, having control inputs 38a and 39a, an output 40a and d-c power inputs 41a and 42a. Operational amplifier 37a is not utilized in the conventional manner, that is, with the amplifier load connected between amplifier output 40a and the midpoint of the d-c supply voltages appearing at power inputs 41a and 42a. Instead, operational amplifier 37a is used as a control device having two alternately and severally operable output circuits, one output circuit being disposed between power input 41a and output 40a and the other output circuit being disposed between power input 42a and output 40a.

One problem in the provision of voltage booster circuitry is the provision of circuitry which increases the magnitude of the d-c subscriber line current but does not increase the magnitude of line current transients. Increased line current transients often cause the improper operation of telephone system relays and the resultant failure of telephone service. In accordance with the present invention, the above problem is avoided by providing structure whereby a predetermined time-delay occurs between changes in the current through line current indicating resistor 35a and resultant changes in the conduction of variable conducting networks 20a and 24a. In accordance with the invention, this time-delay is short enough to allow network A to change its terminal voltage as required to increase the required d-c subscriber line current but is long enough to prevent network A from increasing the amplitude of transient currents. In the present embodiment, the desired time-delay is provided by connecting coupling circuitry including resistors 46a through 49a and capacitors 50a and 51a between amplifier inputs 38a and 39a and resistor 35a.

Assuming that a transient current begins to flow to the right through resistor 35a, terminal 14a will become positive from common $C_A$. The latter voltage will not initially affect the operation of amplifier 37a since the effect of the voltage which is applied to amplifier input 38a through conductor 43a and resistor 46a is cancelled by the effect of the voltage which is applied to amplifier input 39a through conductor 43a, capacitor 51a and resistor 48a. Later, as capacitor 51a charges, the voltage at amplifier input 39a becomes increasingly different from the voltage at amplifier input 38a as the voltage between inputs 38a and 39a approaches a value equal to the voltage across resistor 35a. Thus, the positive voltage at the inputs to amplifier input 37a changes less rapidly than the positive voltage across resistor 35a by an amount determined by the resistance and capacitance values of network 45a.

Resistors 47a and 49a and capacitor 50a produces a similar effect on the negative voltage which is applied to amplifier inputs 38a and 39a through conductor 44a when the voltage across resistor 35a is negative. As a result, sensing-control network 34a cannot change the conduction of networks 20a and 24a rapidly enough to cause the latter to insert boost voltage supplies 16a and 17a in aiding relationship to a-c ringing or transient line currents. Thus, transient line currents are not modified and improper relay operation such as premature ring-trip is materially reduced.

While the time delay introduced by coupling network 45a prevents the terminal voltage of network A from varying instantaneously in accordance with line current in the manner shown in FIG. 2, it will not prevent the terminal voltage of network A from reaching the value shown in FIG. 2 if the subscriber line current or a d-c component thereof remains approximately constant long enough for network 45a to exhaust its ability to delay changes in the voltages at inputs 38a and 39a. As a result, the circuit of FIG. 1 can follow reversals in the polarity of the d-c voltage between central office terminals 12a and 12b without sacrificing its ability to avoid, to the extent desired, following polarity reversals in the a-c ringing voltage. Thus, the circuit of FIG. 1 is able to provide a d-c boost voltage during ringing for trip during ring.

It will be understood the amount of time-delay which must be provided by network 45a to prevent premature ring-trip is dependent upon the tendency of the subscriber to trip prematurely. Accordingly, if the line does not tend to trip prematurely, capacitors 50a and 51a and resistors 46a through 49a may be reduced in size or may even be eliminated by connecting amplifier inputs 38a and 39a to terminal 14a and common $C_A$, respectively. The effect of such changes is, of course, to decrease the time required for changes in line current to produce changes in boost voltage In other words, reducing the size of or eliminating the coupling capacitors and resistors shortens the dynamic response time of networks A and B, that is, causes the boost voltage to attain its steady state value more quickly. The consequences of shortening dynamic response time will be described more fully in connection with networks 71a and 71b.

In spite of the fact that time-delay network 45a prevents network 34a from varying the conduction of variable conducting networks 20a and 24a during ringing, ringing current must flow through booster networks A and B to establish a ringing sound at the telephone set of the called subscriber. In the circuit of FIG. 1, one path for ringing current includes resistor 35a, circuit common $C_A$ and a capacitor 53a. Another path for ringing current includes resistor 35a, circuit common $C_A$, a resistor 70a and the base-emitter circuit of either transistor 21a or 25a, depending upon the direction of current flow. In the operation of my circuit, I have found that the above currents through transistors 21a and 25a do not result in the appearance of a boost voltage between terminals 14a and 15a but that they do cause the resistance between terminals 14a and 15a to be approximately equal to the resistance of resistor 70a divided by the gain of the then conducting one of the transistors.

To the end that control network 34a may control the conduction of first variable conducting network 20a to establish the forward steady-state characteristic shown in FIG. 2, first output circuit 41a-40a of amplifier 37a is connected between positive conductor 27a and circuit common $C_A$ through control transistor 22a, a conductor 54a, a resistor 55a, a breakdown or zener diode 56a, a diode 57a and a resistor 58a. Similarly, to the end that control network 34a may control the conduction of second variable conducting network 24a to establish the reverse steady-state characteristic shown in FIG. 2, second output circuit 40a-42a of amplifier 37a is connected between circuit common $C_A$ and negative conductor 31a through a resistor 60a, a diode 61a, a zener or breakdown diode 62a, a resistor 63a, a conductor 64a and control transistor 26a.

Zener diodes 56a and 62a allow amplifier 37a to operate from the voltage which boost voltage supplies 16a and 17a establish between conductors 27a and 31a. This is because zener diodes 56a and 62a support the difference between the desired d-c operating voltage at amplifier terminals 41a and 42a and the d-c voltage appearing between conductors 27a and 31a. Thus, amplifier 37a draws operative power from boost voltage supplies 16a and 17a but is not restricted to operating at the voltages established thereby.

The manner in which the steady-state operating characteristic shown in FIG. 2 is established will now be described. Throughout the following description, it has been assumed that the time-delay introduced by network 45a has spent itself prior to the time being discussed When the conditions at terminal pairs 12a-12b and 10a-10b are such that no d-c current flows from terminal 14a to terminal 15a through resistor 35a, amplifier inputs 38a and 39a are at the same d-c potential. As a result, amplifier output 40a is at its quiescent value, that is, at the potential of circuit common $C_A$. Under these conditions, diodes 61a and diode 57a are non-conducting, thus preventing the flow of current from amplifier output 40a. As a result, the current which flows from conductor 27a through a resistor 66a, conductor 54a, resistor 55a, zener diode 56a, power input 41a and 42a, zener diode 62a, resistor 63a, conductor 64a and a resistor 67a to conductor 31a, to supply operative power to amplifier 37a, is at its quiescent or no-signal value. In the present embodiment, the resistances of resistors 66a and 67a are such that the base-emitter circuits of transistors 22a and 26a do not conduct when the above conditions exist. As a result, networks 20a and 24a remain non-conducting and thereby prevent boost voltage supplies 16a and 17a from affecting the voltage between terminals 14a and 15a.

The manner in which the circuit of FIG. 1 operates in the positive current region from zero to $I_1$ to afford the previously described test-through feature will now be described. When the conditions at terminal pairs 12a-12b and 10a-10b are such that subscriber line current tends to flow from terminal 14a to terminal 15a, current flows through network A through the path including resistor 35a, circuit common $C_A$, resistor 70a and the base-emitter circuit of transistor 21a. This current establishes, across resistor 35a, a voltage which renders amplifier input 38a positive from common $C_A$. As a result, amplifier output 40a becomes positive from circuit common $C_A$ by a voltage determined by the ratio of the resistances of resistors 68a and 46a. Assuming that the current through resistor 35a is less than the value of subscriber line current at which the output voltage of amplifier 37a becomes sufficient to establish conduction through diode 57a, diode 57a will remain non-conducting and thereby prevent the flow of current from amplifier output 40a. Consequently, the current flowing through amplifier power terminals 41a and 42a will remain at its quiescent valve and thereby continue to be insufficient to establish conduction through variable conducting networks 20a and 24a. Thus, network A produces no boost voltage when the magnitude of the subscriber line current is insufficient to overcome the threshold introduced by diode 57a.

Assuming that the current through resistor 35a is positive and is of a magnitude sufficient to cause the flow of amplifier output current through diode 57a and resistor 58a, the magnitude of the current through amplifier output circuit 41a-40a will increase above it quiescent value as operational amplifier 37a supplies the additional power being dissipated in resistor 58a. This increase in current increases the voltage across resistor 66a thus causing the base-emitter voltage of transistor 22a to approach the value at which the latter transistor will begin to conduct and thereby begin to establish conduction in network 20a. The value of subscriber line current which will bring transistor 22a to the threshold of conduction has been designated $I_1$ in FIG. 2. Thus, when the subscriber line current is in the low current region of FIG. 2, sensing-control network 34a cannot cause variable conducting means 20a to establish a boost voltage. Accordingly, with the above operation, as long as the magnitude of a test current is kept less than current value $I_1$, booster network A cannot produce a boost voltage and cannot, therefore, affect the accuracy of test current readings made therethrough.

*As the subscriber line current through resistor* 35*a* rises above $I_1$, the circuit of the invention operates in its pulse adjusting mode. Under these conditions, voltage at amplifier output 40*a* is at a value at which diode 57*a* will conduct, through amplifier output circuit 41*a*-40*a* and resistor 66*a*, sufficient current to establish collector-emitter conduction through control transistor 22*a*. At this time, booster network A begins to aid the flow of subscriber line current. Thereafter, until amplifier 37*a* saturates, the current flow through control transistor 22*a* and output circuit 41*a*-40*a* increases in proportion to the amplifier output current through resistor 58*a* and, thereby, in proportion to the input voltage of amplifier 37*a* and to the subscriber line current. Thus, the increase in the current through amplifier output circuit 41*a*-40*a* is utilized to vary the conduction of variable conducting means 20*a* and thereby the boost voltage between terminals 14*a* and 15*a*, in the manner shown in the middle or pulse adjusting region of the forward characteristic of FIG. 2.

Since the magnitude of the current through resistor 58*a* is determined by the output voltage of amplifier 37*a* and by the resistance of resistor 58*a*, it follows that, for a given value of amplifier output voltage, the control current through conductor 54*a* is proportional to the resistance of resistor 58*a*. Accordingly, it will be seen that resistor 58*a* determines the slope or rate of change of control current with respect to positive subscriber line current in resistor 35*a*. Thus, a resistor 58*a* serves as a slope control element in that it controls the slope of the pulse adjusting region of the forward V-I characteristic of booster network A.

To the end that the voltage between line terminals 14*a* and 15*a* may be positive and substantially proportional to the control current through conductor 54*a* when subscriber line current is between current values $I_1$ and $I_2$, resistor 70*a* is connected between circuit common $C_A$ and the collector of transistor 22*a* and resistors 66*a* and 65*a* are connected respectively to the base and emitter leads of transistor 22*a*. Since one end of resistor 70*a* is connected to circuit common $C_A$, which is at substantially the same potential as line terminal 14*a*, and since the other end of resistor 70*a* is connected to the base of transistor 21*a*, which is at substantially the same potential as terminal 15*a*, the voltage between terminals 14*a* and 15*a* is substantially equal to the voltage across resistor 70*a*. In addition, because resistor 70*a* is connected between common $C_A$ and transistor 22*a* in the manner shown in FIG. 1, the current through and voltage across resistor 70*a* is proportional to the collector current of transistor 22*a*. Thus, it will be seen that causing the collector current of transistor 22*a* to vary in accordance with the current in conductor 54*a*, causes the voltage between terminals 14*a* and 15*a* to vary in accordance with that current and, consequently, in accordance with the magnitude of the subscriber line current.

In order to cause the collector current of transistor 22*a* to vary in accordance with the current through conductor 54*a*, resistor 65*a* is connected in series with the emitter of transistor 22*a* and resistor 66*a* is connected between the base of transistor 22*a* and conductor 27*a*. Since the voltage across emitter resistor 65*a* is equal to the voltage across resistor 66*a* minus the approximately constant base-emitter voltage of transistor 22*a*, and since the voltage across resistor 66*a* is proportional to the current through conductor 54*a*, the emitter current of transistor 22*a* varies in proportion to the current through conductor 54*a*. Additionally, since the collector current in transistor 22*a* is approximately equal to the emitter current therethrough, it will be seen that the collector current through transistor 22*a* and, consequently, the voltage across resistor 70*a* is proportional to the subscriber line current. Thus, booster network A establishes a boost voltage which varies in the manner shown between currents $I_1$ and $I_2$ of FIG. 2. As a result, if the time-delay of coupling network 45*a* is short enough, the boost voltage between terminals 14*a* and 15*a* can decrease with line current during dial pulses to prevent the circuit of FIG. 1 from increasing the leakage current of the subscriber line.

To the end that variable conducting network 20*a* may conduct the required subscriber line current without disrupting the above described voltage controlling activity of transistor 22*a*, there is provided transistor 21*a*. The latter transistor relieves transistor 22*a* of the burden of conducting substantial amounts of subscriber line current but does not significantly affect the voltage which transistor 22*a* causes to appear between terminals 14*a* and 15*a*. Thus, transistor 21*a* serves as an amplifier stage which provides current gain but no voltage gain. It will be understood that if, for reasons previously described, booster source 16*a* is not utilized, transistor 21*a* should be retained for the purpose of conducting subscriber line current but transistor 22*a* and its associated elements 55*a*, 56*a*, 57*a*, 58*a*, 65*a* and 66*a* may be eliminated (open-circuited).

As previously described, when the subscriber line current is positive and increasing, booster network A establishes, between terminals 14*a* and 15*a*, a boost voltage which is positive and in-creasing. The latter voltage can, however, only increase until there occurs a condition, such as the saturation of transistor 22*a* or the attainment of maximum current flow through amplifier output 40*a*, which prevent further increases in subscriber line current from producing further increases in boost voltage. When either of the above conditions occur, the circuit of FIG. 1 operates in its normal-operating or high current region, that is, above current $I_2$ in FIG. 2.

Because the current that flows through resistor 70*a* also flows through resistor 65*a* and transistor 22*a*, and because resistor 65*a*, the collector-emitter circuit of transistor 22*a* and resistor 70*a* are connected across supply 16*a* through circuit common $C_A$, the voltage across resistor 70*a* can only rise as high as the voltage of supply 16*a* minus the voltage across resistor 65*a* and minus the collector-emitter voltage drop across transistor 22*a*. As a result, the voltage across resistor 70*a* and, consequently, the boost voltage will reach a maximum value when transistor 22*a* saturates, this maximum value being equal to the voltage of supply 16*a* times the ratio of the resistance of resistor 70*a* to the sum of the resistances of resistors 65*a* and 70*a*. Thus, the boost voltage has a maximum value, $V_{max}$, which may be preset at any desired value (less than the voltage of supply 16*a*) by selecting suitable values for resistors 65*a* and 70*a*, the latter serving as boost magnitude control means.

$V_{max}$ may also be preset at any desired value by selecting values for resistors 55*a* and 66*a* and for the gain of amplifier 37*a* such that amplifier 37*a* establishes its maximum value of output current when the subscriber line current reaches a predetermined value. Since the latter condition may be arranged to occur before transistor 22a saturates, it will be seen that the voltage across reistor 70a and, in turn, the boost voltage can be made to stop increasing with subscriber line current at any predetermined value thereof. Thus, resistors 55a and 66a also serve as boost magnitude control means.

It will be understood that when the central office terminal voltage causes subscriber line current to flow in the negative direction through resistor 35a, amplifier 37a operates, in the manner described previously with reference to variable conducting network 20a, to control the conduction of variable conducting network 24a and thereby establish the reverse or negative portion of the steady-state V-I characteristic shown in FIG. 2. Because, however, the circuit elements such as resistors 55a, 65a and 66a which determined the shape of the forward V-I characteristic of booster network A are different from the circuit elements such as resistors 63a, 67a and 69a which determine the shape of the reverse V-I characteristic of booster network A, these V-I characteristics need not be symmetrical.

In view of the foregoing, it will be seen that booster network A exhibits a forward V-I characteristic having a low current region wherein there is produced no boost voltage, a middle current region wherein there is produced a boost voltage proportional to the subscriber line current and a high current region wherein there is produced a substantially constant boost voltage and that booster network A exhibits a similar but not necessarily symmetrical reverse V-I characteristic. It will be understood that booster network B also has forward and reverse V-I characteristics which are similar to but not necessarily identical to those of booster network A. Thus, the forward and reverse V-I characteristics of booster networks A and B may have whatever shapes or combinations of shapes are necessary to meet the testing, pulse adjusting and voltage boost requirements of a wide variety of types of subscriber lines.

To the end that the operative condition of the circuit of FIG. 1 may change rapidly enough to permit the desired transmission of a wink pulse, that is, a pulse the leading and trailing edges of which consist of central office polarity reversals, booster networks A and B are provided with voltage responsive networks 71a and 71b, respectively. The latter networks enable booster networks A and B to override the time delaying effects of coupling networks 45a and 45b, respectively, and thereby allow the circuit of FIG. 1 to instantaneously assume a "transparent" condition in which a wink pulse is afforded substantially unhindered transmission.

In the present embodiment, the desired transparent condition begins at the leading edge of the wink pulse when a reversal in the central office terminal voltage causes one voltage responsive network, for example 71b, to reverse the terminal voltage of booster network B without causing the other voltage responsive network 71a to reverse the terminal voltage of its associated booster network A. Under these conditions, booster networks A and B produce voltages of the same polarity with the result that the voltage of network A is cancelled by the voltage of network B around the subscriber loop. Thus, after the leading edge of the wink pulse, the circuit of FIG. 1 has no effect on the changes in current flow which accompany the wink pulse.

The above transparent condition ends at the trailing edge of the wink pulse when a second reversal in the central office terminal voltage causes previously activated voltage responsive network 71b to relinquish control over booster network B. This, in turn, causes booster network B to re-establish a voltage that aids the voltage of booster network A. The latter aiding condition is re-established relatively rapidly since a wink pulse is too short to allow either coupling network 45a or coupling network 45b to have allowed the reversal at the leading edge of the wink pulse to be felt therethrough. Thus, after the trailing edge of the wink pulse, booster networks A and B once again cooperate to aid the flow of current in the subscriber loop.

In order to assure that voltage responsive networks 71a and 71b control booster networks A and B in accordance with wink pulses but not in accordance with the a-c ringing voltage, networks 71a and 71b are arranged to override coupling networks 45a and 45b under the conditions which exist when a wink pulse occurs but not under the conditions which exist when ringing occurs. Voltage responsive network 71b, for example, can override coupling network 45b when central office terminal 12b becomes negative from ground after having been at or above ground potential for a predetermined time. Similarly, network 71a can override coupling network 45a when central office terminal 12a becomes negative from ground after having been at or above ground potential for a predetermined time. Accordingly, if the above predetermined time is set at a value greater than the duration of one cycle of the ringing voltage, voltage responsive networks 45a and 45b can respond to polarity reversals such as wink pulses which occur only occasionally but cannot respond to the closely spaced or periodic polarity reversals which occur during ringing.

Since voltage responsive networks 71a and 71b are provided to override the time-delay effect introduced by coupling networks 45a and 45b, respectively, it will be seen that if the latter networks are eliminated because premature ring-trip is not a problem, networks 71a and 71b may also be eliminated. If this is done, the boost voltages provided by networks A and B will vary substantially instantaneously in the manner shown in FIG. 2. This, in turn, will cause networks A and B to change operative conditions rapidly enough to increase the amplitude of wink pulses. Thus, where equipment requirements permit, the circuit of FIG. 1 may be arranged to actually enhance the transmission of wink pulses.

The manner in which booster network B distinguishes between occasional and periodic negative excursions in the voltage at terminal 14b will now be described. Assuming that central office terminal 12b is positive from earth ground G, current attempts to charge capacitor 72b positive on its non-ground side by flowing from terminal 12b, through conductor 80b, resistor 73b and capacitor 72b to ground. This charging is limited, however, by diode 78b which clamps the voltage across capacitor 72b to a value equal to the forward voltage drop of diode 78b. Because common $C_B$ is at substantially the same potential as terminal 12b which is, under the assumed condition, positive from ground, diode 77b is reverse biased, thus effectively decoupling capacitor 72b from conductor 79b and amplifier input 39b. Thus, when terminal 12b is positive from ground, network 71b does not effect the operative condition of amplifier 37b.

Assuming that central office terminal 12b becomes negative from earth ground G, capacitor 72b will charge positive on its ground side by a first charging current which flows from ground G through capacitor 72*b*, resistor 73*b* and conductor 80*b*. Capacitor 72*b* will also be charged positive on its ground side by a second charging current which flows from ground through capacitor 72*b*, diode 77*b*, and resistors 74*b* and 75*b* to common $C_B$. If capacitor 72*b* is substantially uncharged when terminal 12*b* becomes negative from ground, second charging current will be large enough in magnitude to establish, across resistor 75*b*, a voltage sufficient to forward bias diode 76*b* and energize amplifier input 39*b*. If, on the other hand, capacitor 72*b* has an appreciable charge, positive on its ground side, when terminal 12*b* goes negative from ground, the above described second charging current will be appreciably smaller in magnitude and will, therefore, be unable to forward bias diode 76*b*. Thus, network 71*b* can energize amplifier input 39*b* only if the voltage from ground G to terminal 12b becomes negative at a time when capacitor 72*b* is substantially uncharged.

During ringing, terminal 12*b* becomes alternately positive and negative with respect to ground G. During the first negative half cycle of the ringing voltage, capacitor 72*b* will charge positive on its ground side by the above described first and second charging currents. During the succeeding positive half cycle of the ringing voltage, current flowing from terminal 12*b* through conductor 80*b* and resistor 73*b* to ground begins to uncharge capacitor 72*b*. If, however, the resistance of resistor 73*b* is made large to preserve the desired high leakage resistance between the subscriber line conductors and between ground and either subscriber line conductor, and if resistors 74*b* and 75*b* are small in comparison to resistor 73*b*, it will take considerably longer to uncharge capacitor 72*b* than it did to charge it. Accordingly, the charge which accumulates on ground side of capacitor 72*b* during the negative half cycle of the ringing voltage is not appreciably affected by the uncharging current which flows during the positive half cycle of the ringing voltage. As a result, within a short time after ringing begins, the ground side of capacitor 72*b* charges to a substantial positive voltage and thereby prevents the forward biasing of diode 76*b*. Thus, within a short time after ringing begins, voltage responsive network 71*b* is unable to effect the operative condition of amplifier 37*b*.

In the course of winking, however, terminal 12*b* is initially at ground potential, goes negative from ground for a time on the order of 100 milliseconds, and then returns to its initial condition. Since this winking activity occurs only occasionally and only after terminal 12*b* has been at ground potential for a time sufficient for capacitor 72*b* to eliminate any charge thereon by discharging through resistor 73*b*, capacitor 72*b* is substantially uncharged at the beginning of each wink pulse. As a result, network 71*b* is ready to override network 45*b* during each wink pulse. Thus, voltage responsive network 71*b* is adapted to control amplifier 37*b* during occasional negative excursions in the voltage at terminal 12*b* but is unable to control amplifier 37*b* in the presence of periodic negative excursions in that voltage.

In addition to operating to accommodate wink pulses, voltage responsive networks 71*a* and 71*b* affect the manner in which the circuit of FIG. 1 terminates a boost voltage of one polarity and establishes a boost voltage of the opposite polarity when there occurs supervisory reversals in the d-c voltage between central office terminals 12*a* and 12*b*. The above activity will be described in connection with FIGS. 3*a* through 3*e* which illustrate the time relationships of various changes in voltage in the circuit of FIG. 1. In referring to FIGS. 3*a* through 3*e*, it will be understood that the time interval between supervisory reversals in the voltage between terminals 12*a* and 12*b* ($T_1$ to $T_3$ ) has been made to appear short only for the sake of clarity of illustration.

Figure 3:
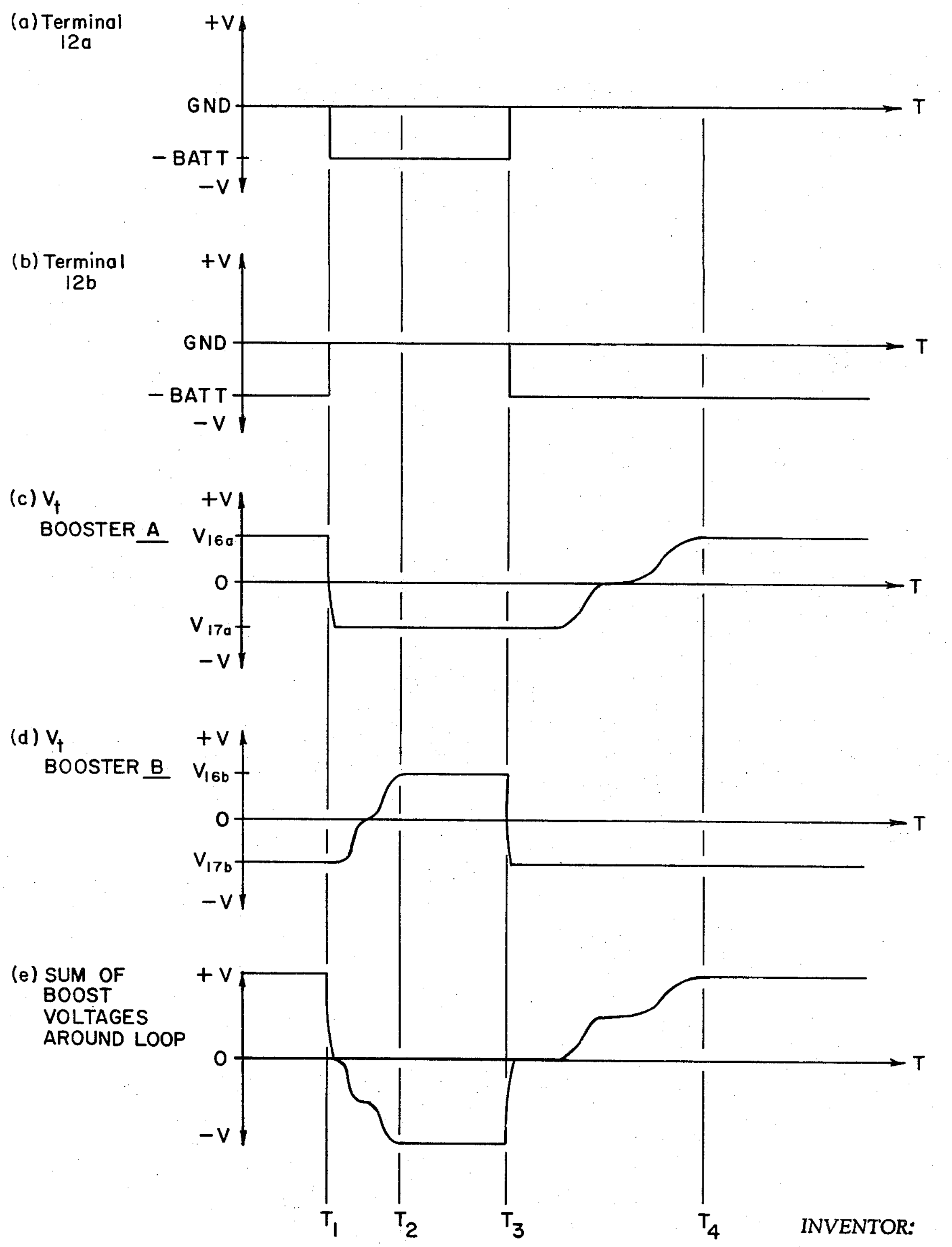
FIGS. 3*a*, 3*b*, 3*c*, 3*d* and 3*e* are graphs showing various voltages appearing in the circuit of FIG. 1 as a function of time.

In the example shown in FIGS. 3*a* and 3*b*, prior to time $T_1$, central office terminal 12*a* is positive from central office terminal 12*b*. More specifically, central office terminal 12*a* is at ground potential and central office terminal 12*b* is at the potential of the negative terminal of the central office battery, -BATT. Under these conditions, booster network A produces a positive boost voltage which increases the subscriber line current flowing away from the central office in conductor 11*a* and booster network B produces a negative boost voltage which increases the magnitude of the subscriber line current flowing towards the central office in conductor 11*b*. As shown in FIG. 3*e*, the above boost voltages add together around the subscriber loop to aid the voltage between central office terminals 12*a* and 12*b*.

Later, at time $T_1$, when the central office equipment initiates a supervisory polarity reversal, central office terminal 12*b* rises to ground potential and central office terminal 12*a* drops below ground potential to voltage -BATT. Under these conditions, voltage responsive network 71*a* triggers a reversal in the polarity of the terminal voltage of booster network A but network 71*b* is unable to trigger a similar reversal in the polarity of the terminal voltage of booster network B. As a result, the voltage across booster network A reverses substantially instantaneously and the voltage across booster network B reverses slowly in accordance with the time constant of coupling network 45*b*. Accordingly, immediately following time $T_1$, the voltages across booster networks A and B have the same polarity and magnitude resulting in the mutual cancellation of their terminal voltages around the subscriber loop. This cancellation causes the net boost voltage around the subscriber loop to drop suddenly to zero as shown in FIG. 3*e*. Thereafter, as the time-delay caused by coupling network 45*b* of booster network B elapses, the voltage across the latter reverses causing the net boost voltage around the subscriber loop to rise from zero toward the steady state value at which booster networks A and B will cooperate fully in aiding the reversed voltage between terminals 12*a* and 12*b*. The time at which the latter condition will occur has been labeled $T_2$ in FIG. 3*e*.

In view of the foregoing, it will be seen that while it takes the time interval $T_1$-$T_2$ for the circuit of FIG. 1 to change from its positive steady state boost condition to its negative steady state boost condition, the circuit of FIG. 1 does not, in the process, assume a condition in which it opposes the central office terminal voltage. Thus, the circuit of FIG. 1 changes operative conditions rapidly when rapidity of change is desirable to prevent a bucking relationship between the central office and the circuit of the invention but changes operative conditions slowly when slowness of change is desirable to prevent the circuitry from aiding the flow of transient currents and thereby increasing the probability of improper operation of circuit relays.

Similarly, at time $T_3$ when the central office terminal voltage reverses once again, voltage responsive network **71*b* immediately triggers a reversal in the voltage of network B while voltage responsive network 71*a* is unable to trigger a similar reversal in the voltage of booster network A. As a result, the net boost voltage provided by the circuit of FIG. 1** drops to zero substantially instantaneously and thereafter slowly begins to aid the central office terminal voltage as booster network A reverses during time interval $T_3$-$T_4$.

Since the length of time-delay interval $T_1$-$T_2$ is determined by the resistances and capacitances of coupling network **45*a* while the length of time-delay interval $T_3$-$T_4$ is determined by the resistances and capacitances of coupling network 45*b***, the time-delay interval for network A may be set at a high value to afford protection from premature ring-trip while the time-delay interval for booster network B may be set at a substantially lower value to afford pulse adjustment. In one embodiment of the invention, for example, the time-delay interval $T_1$—$T_2$ of booster network B may be made substantially shorter than the time-delay interval $T_3$—$T_4$ of booster network A. This allows booster network B to exhibit the desired pulse adjusting characteristic by turning off to provide a reduced boost voltage during each dial pulse and by turning on to provide full boost voltage between dial pulses while it allows booster network A to turn on slowly to prevent the flow of excessive transient currents upon polarity reversal.

It will be understood that if the problem of providing protection from premature ring-trip is less serious than the problem of providing a high degree of pulse adjustment, both booster networks may be adjusted to turn on and off rapidly in response to dial pulse interruptions. If, on the other hand, the problem of preventing premature ring trip is more serious than the problem of providing pulse adjustment, both booster networks may be adjusted to turn on slowly. Thus, the circuit of the invention can operate to the benefit of subscriber lines having a wide variety of problems. From the foregoing, it will be seen that in some applications it is desirable to arrange the booster networks on each side of the line to exhibit the same time-delay characteristics or to arrange them to exhibit differing time-delay characteristics.

As previously described, sensing-control means **34*a* is a control network which serves to control the conduction of variable conducting networks 20*a* and 24*a*. It will be seen that networks 20*a* and 24*a* serve to extend the current and voltage capability of operational amplifier 37*a*. Considered in this manner, networks 34*a*, 20*a* and 24*a* are collectively a single composite operational amplifier which includes an operational amplifier (37*a*) of lesser voltage and current rating. Accordingly, it will be understood that an operational amplifier having the necessary voltage and current capability may be substituted for the separate networks 34*a*, 20*a* and 24*a*. Under these circumstances, the control inputs of the higher-rated operational amplifier may be connected in the manner of control imputs 38*a* and 39*a* of amplifier 37*a*, the power inputs of the higher-rated operational amplifier may be connected to voltage sources 16*a* and 17*a* and the output of the higher-rated operation amplifier may be connected to the manner of terminal 15*a*. In this event, output circuits 41*a*-40*a* and 40*a*-42*a*** serve directly as variable conducting paths for the flow of subscriber line current.

In view of the foregoing, it will be seen that the voltage booster circuit of the invention is adapted to provide a boost voltage which varies in accordance with the magnitude and direction of the subscriber line current to afford desirable testing, pulse-adjusting and normal operating characteristics. It will further be seen that the circuit of the invention is highly suitable for providing effective transmission of wink pulses and for reducing the probability of improper relay operation, for example, premature ring-trip.

It will be understood that the embodiment shown herein is for explanatory purposes and any be changed or modified without departing from the spirit and scope of the appended claims.

What is claimed is:

1. A voltage booster circuit having a test-through characteristic, said voltage booster circuit including, in combination, central office terminal means, subscriber terminal means, means for connecting said terminal means in series with one conductor of a subscriber line, line current indicating means, means for connecting said line current indicating means to the subscriber line, boost voltage supply means, variable conducting means, means for connecting said boost voltage supply means between said terminal means through said variable conducting means, means for increasing the conduction through said variable conducting means as the current through said line current indicating means increases above a predetermined value, threshold means for preventing conduction through said variable conducting means when the current through said line current indicating means is less than said predetermined value, time-delay means for introducing a time-delay between changes in the current through said current indicating means and resultant changes in the conduction of said variable conducting means and means for conducting current between said terminal means when the flow of current through said line current indicating means is less than said predetermined value.

2. A voltage booster circuit as set forth in claim 1 including ground terminal means, voltage responsive means for overriding said time-delay means when the voltage between said ground terminal means and said one conductor of the subscriber line assumes a predetermined polarity and means for connecting said voltage responsive means to said ground terminal means and to said one conductor of the subscriber line.

3. A voltage booster circuit having a test-through characteristic, said voltage booster circuit including, in combination, central office terminal means, subscriber terminal means, means for connecting said terminal means in series with one conductor of a subscriber line, line current indicating means, means for connecting said line current indicating means to the subscriber line, first and second boost voltage supply means, first and second variable conducting means, means for connecting respective boost voltage supply means between said terminal means through respective variable conducting means, means for increasing the conduction through said first or second variable conducting means, respectively, as the current through said line current indicating means increases above respective positive or negative predetermined values, threshold means for preventing conduction through said first and second variable conducting means when the current through said line current indicating means is between said positive and negative predetermined values, time-delay means for introducing a time-delay between changes in the magnitude or direction of the current through said line current indicating means and resultant changes in the conduction of said variable conducting means and means for conducting current between said terminal means when the flow of current through said line current indicating means is between said positive and negative predetermined values.

4. A voltage booster circuit as set forth in claim 3 including ground terminal means, voltage responsive means for overriding said time-delay means when the voltage between said ground terminal means and said one conductor of the subscriber line assumes a predetermined polarity and means for connecting said voltage responsive means to said ground terminal means and to said one conductor of the subscriber line.

5. A voltage booster circuit having a test-through characteristic, said voltage booster circuit including, in combination, a plurality of voltage booster networks each having central office terminal means and subscriber terminal means, means for connecting the central office and subscriber terminal means of each booster network in series with a respective conductor of a subscriber line, each voltage booster network including: first and second boost voltage supply means, first and second variable conducting means, means for connecting respective boost voltage supply means between said terminal means through respective variable conducting means, line current indicating means, means for connecting said indicating means to the subscriber line, means for increasing the conduction through said first or second variable conducting means, respectively, as the current through said line current indicating means increases above respective positive or negative predetermined values, threshold means for preventing conduction through said first and second variable conducting means when the current through said line current indicating means is between said positive and negative predetermined values, time-delay means for introducing a time-delay between changes in the magnitude or direction of the current through said line current indicating means and resultant changes in the conduction of said variable conducting means and means for conducting current between said terminal means when the flow of current through said line current indicating means is between said positive and negative predetermined values.

6. A voltage booster circuit as set forth in claim 5 in which each voltage booster network includes ground terminal means, voltage responsive means for overriding said time-delay means when the voltage between said ground terminal means and the respective one of the conductors of the subscriber line assumes a predetermined polarity and means for connecting said voltage responsive means to said ground terminal means and to the respective one of the conductors of the subscriber line.

7. A voltage booster circuit having a test-through characteristic, said voltage booster circuit including, in combination, a plurality of voltage booster networks each having central office terminal means and subscriber terminal means, means for connecting the central office and subscriber terminal means of each booster network in series with a respective conductor of a subscriber line, each voltage booster network including: line current indicating means, means for connecting said line current indicating means to the subscriber line, a boost voltage supply, variable conducting means, means for connecting said boost voltage supply means between said terminal means through said variable conducting means when current flows through said line current indicating means in one direction, means for conducting subscriber line current between said terminal means when current flows through said line current indicating means in the other direction, means for increasing the conduction through said variable conducting means in accordance with increases in the current through said line current indicating means in said one direction when the latter current is greater than a predetermined value, threshold means for preventing conduction through said variable conducting means when the instantaneous value of the flow of current through said line current indicating means in said one direction is less than said predetermined value, time-delay means for introducing a time-delay between changes in the magnitude or direction of the current through said current indicating means and resultant changes in the conduction of said variable conducting means and means for conducting current between said line terminal means when the flow of current through said line current indicating means is less than said predetermined value.

8. A voltage booster circuit as set forth in claim 7 in which each voltage booster network includes ground terminal means, voltage responsive means for overriding said time-delay means when the voltage between said ground terminal means and the respective one of the conductors of the subscriber line assumes a predetermined polarity and means for connecting said voltage responsive means to said ground terminal means and to the respective one of the conductors of the subscriber line.

9. A voltage booster circuit having a test-through characteristic, said voltage booster circuit including, in combination, central office terminal means, subscriber terminal means, means for connecting said terminal means in series with one conductor of a subscriber line, line current indicating means, means for connecting said line current indicating means to the subscriber line, boost voltage supply means, variable conducting means, means for connecting said boost voltage supply means between said terminal means through said variable conducting means, control means for decreasing the voltage across said variable conducting means in accordance with increases in the current through said line current indicating means when the latter current is greater than a first predetermined value and for maintaining a substantially fixed voltage across said variable conducting means when the current through said line current indicating means exceeds a second predetermined value, means for connecting said control means to said line current indicating means and means for conducting current between said terminal means when the flow of current through said line current indicating means is less than said first predetermined value.

10. A voltage booster circuit having a test-through characteristic, said voltage booster circuit including, in combination, central office terminal means, subscriber terminal means, means for connecting said terminal means in series with one conductor of a subscriber line, means for establishing a first, predetermined value of positive resistance between said terminal means when the current through the subscriber line is between zero and a first positive value, means for establishing a first, predetermined value of negative resistance between said line terminal means when the current through the subscriber line is between said first positive value and a second positive value, means for establishing a predetermined positive voltage between said terminal means when the current through the subscriber line is greater than said second positive value, means for establishing a second, predetermined value of positive resistance between said terminal means when the current through the subscriber line is between zero and a first negative value, means for establishing a second, predetermined value of negative resistance between said terminal means when the current through the subscriber line is between said first negative value and a second negative value and means for establishing a predetermined negative voltage between said terminal means when the current through the subscriber line is greater then said second negative value.

11. A voltage booster circuit having a test-through characteristic, said voltage booster circuit including, in combination, central office terminal means, subscriber terminal means, means for connecting said terminal means in series with one conductor of a subscriber line, means for establishing a predetermined positive resistance between said terminal means when the current through the subscriber line in one direction is between zero and a first value, means for establishing a predetermined negative resistance between said terminal means when the current through the subscriber line in said one direction is between said first value and a second value, means for establishing a predetermined positive voltage between said terminal means when the current through the subscriber line in said one direction is greater than said second value, and means for establishing a second predetermined positive resistance between said terminal means when the current through the subscriber line flows in the other direction.

12. A voltage booster circuit having a test-through characteristic, said voltage booster circuit including, in combination, central office terminal means, subscriber terminal means, means for connecting said terminal means in series with one conductor of a subscriber line, line current indicating means, means for connecting said line current indicating means to the subscriber line, boost voltage supply means, amplifying means having input means and output means, means for connecting said boost voltage supply means between said terminal means through the output means of said amplifying means, means for connecting the input means of said amplifying means to said line current indicating means, said amplifying means serving to increase the voltage between said terminal means in accordance with increases in the current through said line current indicating means when the latter current is greater than a predetermined value, threshold means for preventing conduction through said output means when the current through said line current indicating means is less than said predetermined value and means for conducting current between said terminal means when the flow of current through said line current indicating means is less than said predetermined value.

13. A voltage booster circuit having a test-through characteristic, said voltage booster circuit including, in combination, central office terminal means, subscriber terminal means, means for connecting said terminal means in series with one conductor of a subscriber line, line current indicating means, means for connecting said line current indicating means to the subscriber line, positive and negative boost voltage supply means, amplifying means having input means and first and second output means, means for connecting said positive and negative boost voltage supply means between said terminal means through respective first and second output means of said amplifying means, means for connecting the input means of said amplifying means to said line current indicating means, said amplifying means serving to increase the flow of current through said first or second output means, respectively, in accordance with increases in the current through said line current indicating means when the latter current is greater than respective positive or negative predetermined values, threshold means for preventing current flow through said first and second output means when the current through said line current indicating means is between said positive and negative predetermined values and means for conducting current between said terminal means when the flow of current through said line current indicating means is between said positive and negative predetermined values.

14. A voltage booster circuit having a test-through characteristic, said voltage booster circuit including, in combination, a plurality of voltage booster networks each having central office terminal means and subscriber terminal means, means for connecting the central office and subscriber terminal means of each booster network in series with a respective conductor of a subscriber line, each voltage booster network including: positive and negative boost voltage supply means, amplifying means having input means and first and second output means, means for connecting said positive and negative boost voltage supply means between said terminal means through respective first and second output means of said amplifying means, line current indicating means, means for connecting said line current indicating means to the subscriber line, said amplifying means serving to increase the flow of current through said first or second output means, respectively, in accordance with increases in the current through said line current indicating means when the latter current increases above respective positive or negative predetermined values, means for connecting the input means of said amplifying means to said line current indicating means, threshold means for preventing current flow through said first and second output means when the current through said line current indicating means is between said positive and negative predetermined values and means for conducting current between said terminal means when the flow of current through said line current indicating means is between said positive and negative predetermined values.

15. A voltage booster circuit having a test-through characteristic, said voltage booster circuit including, in combination, a plurality of voltage booster networks each having central office terminal means and subscriber terminal means, means for connecting the terminal means of each booster network in series with a respective conductor of a subscriber line, each voltage booster network including: line current indicating means, means for connecting said line current indicating means to the subscriber line, a boost voltage supply, amplifying means having input means and output means, means for connecting said boost voltage supply between said terminal means through the output means of said amplifying means, said amplifying means serving to increase the flow of current through said output means in accordance with increases in the flow of current through said line current indicating means in one direction when the latter current is greater than a predetermined value, means for conducting current between said terminal means when current flows through said line current indicating means in the other direction, means for connecting the input means of said amplifying means to said line current indicating means, threshold means for preventing current flow through said output means when the current through said line current indicating means is less than said predetermined value and means for conducting current between said terminal means when the flow of current through said line current indicating means is less than said predetermined value.

16. A voltage booster circuit having a test-through characteristic, said voltage booster circuit including, in combination, central office terminal means, subscriber terminal means, means for connecting said terminal means in series with one conductor of a subscriber line, line current indicating means, means for connecting said line current indicating means to the subscriber line, boost voltage supply means, variable conducting means, means for connecting said boost voltage supply means between said terminal means through said variable conducting means, amplifying means for increasing the flow of current through said variable conducting means as the current through said line current indicating means increases above a predetermined value, said amplifying means having input means and output means, means for connecting the output means of said amplifying means to said varible conducting means, means for connecting the input means of said amplifying means to said line current indicating means, threshold means for preventing current from flowing through said variable conducting means when the current through said line current indicating means is less than said predetermined value and means for conducting current between said terminal means when the flow of current through said line current indicating means is less than said predetermined value.

17. A voltage booster circuit as set forth in claim 16 in which said variable conducting means includes a control transistor having a power circuit and a control circuit, a line current carrying transistor having a power circuit and a control circuit, means for connecting the power circuit of said line current carrying transistor to said terminal means and said boost voltage supply means and means for connecting the power circuit of said control transistor to the control circuit of said line current carrying transistor.

18. A voltage booster circuit as set forth in claim 17 including resistance means and means for connecting said resistance means to said boost voltage supply means and to said transistors.

19. A voltage booster circuit having a test-through characteristic, said voltage booster circuit including, in combination, central office terminal means, subscriber terminal means, means for connecting said terminal means in series with one conductor of a subscriber line, line current indicating means, means for connecting said line current indicating means to the subscriber line, first and second boost voltage supply means, first and second variable conducting means, means for connecting said boost voltage supply means between said terminal means through said variable conducting means, amplifying means for increasing the flow of current through said first or second variable conducting means, respectively, as the current through said line curent indicating means increases above respective positive or negative predetermined values, means for connecting said amplifying means to said line current indicating means and to said variable conducting means, threshold means for preventing current flow through said first and second variable conducting means when the current through said line current indicating means is between said positive and negative predetermined values and means for conducting current between said terminal means when the flow of current through said line current indicating means is between said positive and negative predetermined values.

20. A voltage booster circuit as set forth in claim 19 in which each variable conducting means includes a control transistor having a power circuit and a control circuit, a line current carrying transistor having a power circuit and a control circuit, means for connecting the power circuit of said line current carrying transistor to said terminal means and said boost voltage supply means and means for connecting the power circuit of said control transistor to the control circuit of said line current carrying transistor.

21. A voltage booster circuit as set forth in claim 20 including resistance means and means for connecting said resistance means to said boost voltage supply means and to said transistors.

22. A voltage booster circuit having a test-through characteristic, said voltage booster circuit including, in combination, a plurality of voltage booster networks each having central office terminal means and subscriber terminal means, means for connecting the terminal means of each booster network in series with a respective conductor of a subscriber line, each voltage booster network including: first and second boost voltage supply means, first and second variable conducting means, means for connecting said boost voltage supply means between said terminal means through respective variable conducting means, line current indicating means, means for connecting said line current indicating means to the subscriber line, amplifying means for increasing the flow of current through said first or second variable conducting means, respectively, as the current through said line current indicating means increases above respective positive or negative predetermined values, means for connecting said amplifying means to said line current indicating means and to said variable conducting means, threshold means for preventing current flow through said first and second variable conducting means when the current through said line current indicating means is between said positive and negative predetermined values and means for conducting current between said terminal means when the flow of current through said line current indicating means is between said positive and negative predetermined values.

23. A voltage boosting circuit as set forth in claim 22 in which the variable conducting means of each booster network includes a control transistor having a power circuit and a control circuit, a line current carrying transistor having a power circuit and a control circuit, means for connecting the power circuit of said line current carrying transistor to said terminal means and said boost voltage supply means, and means for connecting the power circuit of said control transistor to the control circuit of said line current carrying transistor.

24. A voltage booster circuit as set forth in claim 23 in which each booster network includes resistance means and means for connecting said resistance means to said boost voltage supply means and to said transistors.

25. A voltage booster circuit having a test-through characteristic, said voltage booster circuit including, in combination, a plurality of voltage booster networks each having central office terminal means and subscriber terminal means, means for connecting the terminal means of each booster network in series with a respective conductor of a subscriber line, each voltage booster network including: line current indicating means, means for connecting said line current indicating means to the subscriber line, a boost voltage supply, variable conducting means, means for connecting said boost voltage supply between said terminal means through said variable conducting means when current flows through said line current indicating means in one direction, means for conducting current between said terminal means when current flows through said line current indicating means in the other direction, amplifying means for increasing the flow of current through said variable conducting means in accordance with increases in the current through said line current indicating means in said one direction when the latter current is greater than a predetermined value, means for connecting said amplifying means to said line current indicating means and to said variable conducting means, threshold means for preventing current flow through said variable conducting means when the current through said line current indicating means is less than said predetermined value and means for conducting current between said terminal means when the flow of current through said line current indicating means is less than said predetermined value.

26. A voltage boosting circuit as set forth in claim 25 in which the variable conducting means of each booster network includes a control transistor having a power circuit and a control circuit, a line current carrying transistor having a power circuit and a control circuit, means for connecting the power circuit of said line current carrying transistor to said terminal means and said boost voltage supply and means for connecting the power circuit of said control transistor to the control circuit of said line current carrying transistor.

27. A voltage boosting circuit as set forth in claim 26 in which each booster network includes resistance means and means for connecting said resistance means to said boost voltage supply and to said transistors.

28. In a voltage booster circuit, in combination, central office terminal means, subscriber terminal means, means for connecting said terminal means in series with one conductor of a subscriber line, line current indicating means, means for connecting said line current indicating means to the subscriber line, boost voltage supply means, variable conducting means, means for connecting said boost voltage supply means between said terminal means through said variable conducting means, control means for increasing the conduction through said variable conducting means in accordance with increases in the current through said line current indicating means and time-delay means for introducing a time-delay between changes in the magnitude or direction of the current through said line current indicating means and resultant changes in the conduction of said variable conducting means.

29. In a voltage booster circuit, in combination, central office terminal means, subscriber terminal means, means for connecting said terminal means in series with one conductor of a subscriber line, line current indicating means, means for connecting said line current indicating means to the subscriber line, boost voltage supply means, variable conducting means, means for connecting said boost voltage supply means between said terminal means through said variable conducting means, control means for increasing the conduction through said variable conducting means in accordance with increases in the current through said line current indicating means, coupling means for introducing a time-delay between changes in the magnitude or direction of the current through said line current indicating means and resultant changes in the conduction of said variable conducting means and means for connecting said coupling means between said line current indicating means and said control means.

* * * * *

UNITED STATES PATENT OFFICE

CERTIFICATE OF CORRECTION

Patent No. 3,763,320 Dated October 2, 1973

Inventor(s) Charles W. Chambers, Jr.

It is certified that error appears in the above-identified patent and that said Letters Patent are hereby corrected as shown below:

In the specification, column 5, line 17, change "22a" to --11a--. Column 6, line 30, change "V " to --V --. Column 9, line 62, insert a period after "cussed". Column 10, line 6, change "input" to --inputs--. Column 10, line 38, change "valve" to --value--. Column 10, line 49 change "it" to --its--. Column 11, line 29, after "Thus" delete the word "a". Column 12, line 34, change "in-creasing" to --increasing--. Column 13, line 3, change "reistor" to --resistor--. Column 17, line 64, change "operation" to --operational--. Column 18, line 12, change "any" to --may--. In the claims, claim 16, line 17, change "varible" to --variable--.

Signed and sealed this 4th day of June 1974.

(SEAL)
Attest:

EDWARD M.FLETCHER,JR.
Attesting Officer

C. MARSHALL DANN
Commissioner of Patents